United States Patent [19]
Troester et al.

[11] 3,835,961
[45] Sept. 17, 1974

[54] DISK TYPE BRAKE

[75] Inventors: Thomas F. Troester, Dayton; Russell E. Rike, Bellbrook, both of Ohio

[73] Assignee: Dayton-Walther Corporation, Dayton, Ohio

[22] Filed: May 7, 1973

[21] Appl. No.: 357,891

[52] U.S. Cl. ........... 188/71.9, 188/196 F, 188/106 F
[51] Int. Cl. ........................................... F16d 65/56
[58] Field of Search .......... 188/71.8, 71.9, 79.5 GE, 188/196 F, 196 D, 196 BA, 106 F

[56] References Cited
UNITED STATES PATENTS

| | | | |
|---|---|---|---|
| 1,971,643 | 8/1934 | De Lavaud | 188/196 BA |
| 2,669,327 | 2/1954 | Chamberlain et al. | 188/71.9 |
| 2,733,781 | 2/1956 | Brisson | 188/196 BA |
| 3,331,472 | 7/1967 | Swift | 188/71.9 |

*Primary Examiner*—Duane A. Reger
*Attorney, Agent, or Firm*—Biebel, French & Bugg

[57] ABSTRACT

A disk brake which includes automatic compensation for wearing of the brake pads and provides a mechanical system for applying the brake or holding the brake in place after actuation by the hydraulic system. The brake piston is movable relative to a threaded shaft. The piston has an annular toothed surface for like engagement with a rotatable pressure member threaded on the shaft. On adjustment overtravel of the piston, the toothed surfaces separate, allowing a finger spring to rotate the pressure member and adjust the brake.

11 Claims, 6 Drawing Figures

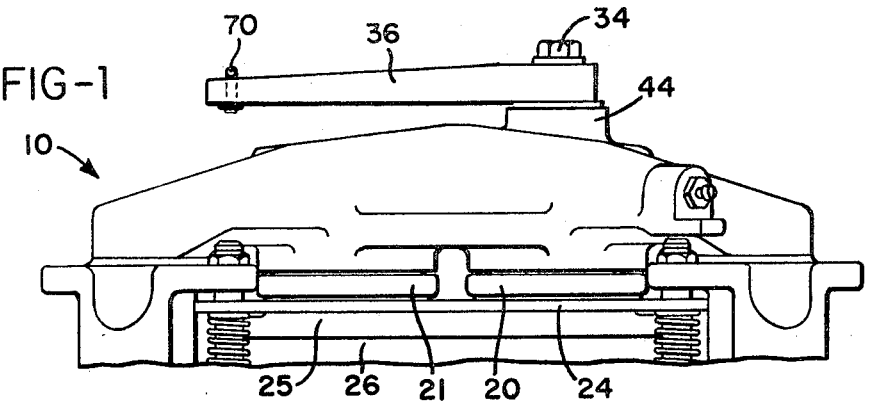
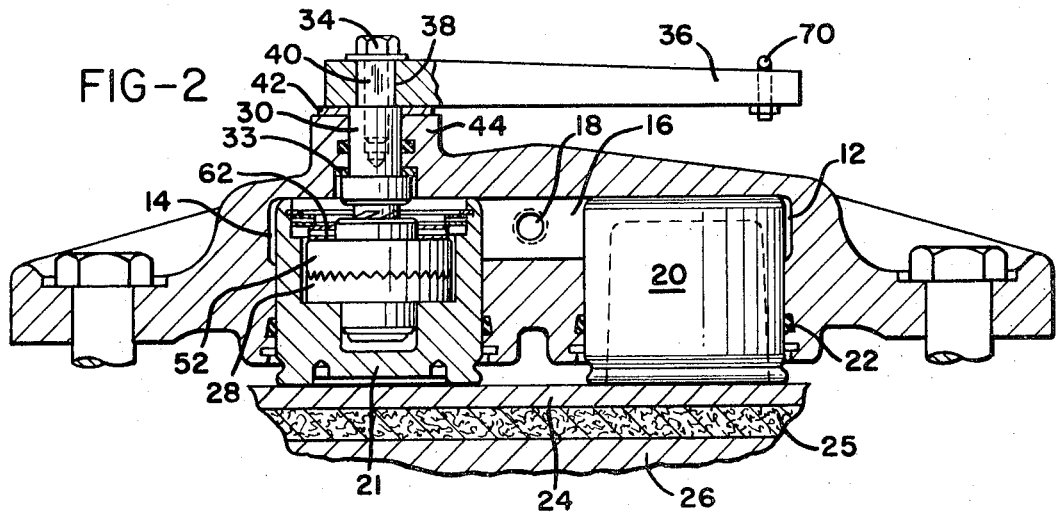
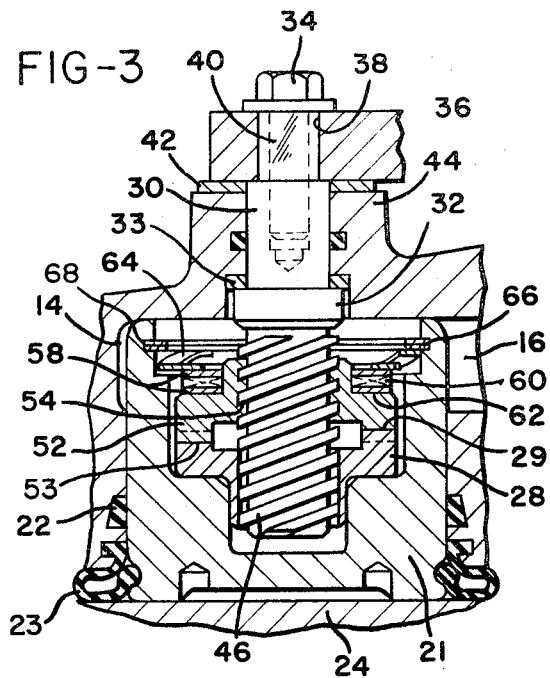
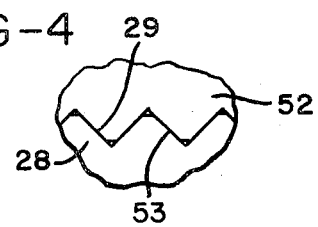
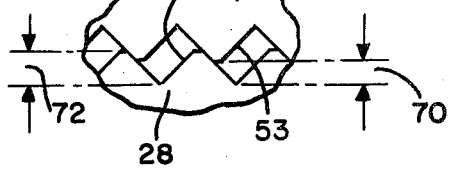

DISK TYPE BRAKE

BACKGROUND OF THE INVENTION

In the past, a mechanically actuatable set of drum brakes was generally used in conjunction with disk type brakes because of problems involved in mechanically actuating the disk brakes. More recently systems have been developed which permit disk type brakes to be actuated either hydraulically or machanically. For example, see U.S. Pat. Nos. 3,357,522; 3,610,373; 3,688,875 and 3,701,400.

Systems which provide for both hydraulic and mechanical actuation of disk brakes are, however, generally of somewhat complicated construction, including counteracting springs, and various types of friction clutch systems. Obviously, the more complicated such systems become, the more susceptible they are to malfunction and the greater the amount of maintenance required to maintain the systems functioning properly.

SUMMARY OF THE INVENTION

The present invention provides a disk type brake system in which at least one piston can be applied either mechanically or hydraulically and held in a braking position by a mechanical system while at the same time providing automatic compensation for brake pad wear.

In the preferred embodiment of the invention a dual brake system is contemplated with a pair of pistons mounted in each of the caliper housings. At least one of the pistons, in addition to being hydraulically actuatable, is provided with means for mechanically actuating the piston and also, for holding it in a braking position regardless of how it is actuated.

Specifically, at least one of the pistons received in the caliper housing is hollow and has an annular toothed surface therein facing inwardly of the cylinder in which it is received. A shaft having a high lead thread is rotatably mounted in the housing but fixed against movement longitudinally of its axis.

The threaded end of the shaft extends into the cylinder and engages complementary threads on a pressure member which also has an annular toothed surface complementary to and engageable with the annular toothed surface of the piston. A spring engages the pressure member and urges its toothed surface into engagement with the toothed surface carried by the piston.

With this system, as long as the travel of the piston during braking is no greater than the depth of the opposed teeth on the piston and the pressure member, the pressure member will not move axially of the shaft. However, when the travel of the piston during braking exceeds the depth of the teeth, the spring associated with the piston will force the pressure member outwardly along the threaded shaft, thus compensating for wearing of the brake pads.

A lever is mounted on an outer end of the shaft which projects outwardly from the caliper housing and the lever is connected, by a cable or link for example, to a parking brake handle or pedal in the cab of the vehicle with which the system is associated. Therefore, when it is desired to set the parking brake, the handle or pedal may be actuated or, the service brakes may be actuated and then the parking brake handle or pedal. In either case, the threaded shaft will be rotated in the caliper housing, either moving the pressure member and piston into the braking position or, after the piston has been hydraulically moved into the braking position, moving the pressure member into engagement with the piston.

In accordance with one embodiment of the invention, the threaded shaft is threaded externally and the pressure member comprises an internally threaded nut having an annular toothed surface thereon. In another preferred embodiment, the threaded shaft is threaded internally and the pressure member is provided with an externally threaded portion threadably received within the internal threaded shaft.

In both embodiments the present system provides a disk brake which can be mechanically actuated or hydraulically actuated and mechanically held in position and which provides for automatic compensation of braking pad wear.

BRIEF DESCRIPTION OF THE DRAWINGS

FIG. 1 is a view showing a caliper housing and portions of the associated components;

FIG. 2 is an enlarged view of a portion of a first embodiment of the invention with parts in section;

FIG. 3 is an enlarged cross-sectional view of a portion of FIG. 2;

FIGS. 4 and 5 are enlarged views of the interengaging teeth in different positions.

DESCRIPTION OF THE PREFERRED EMBODIMENTS

Figure 6:
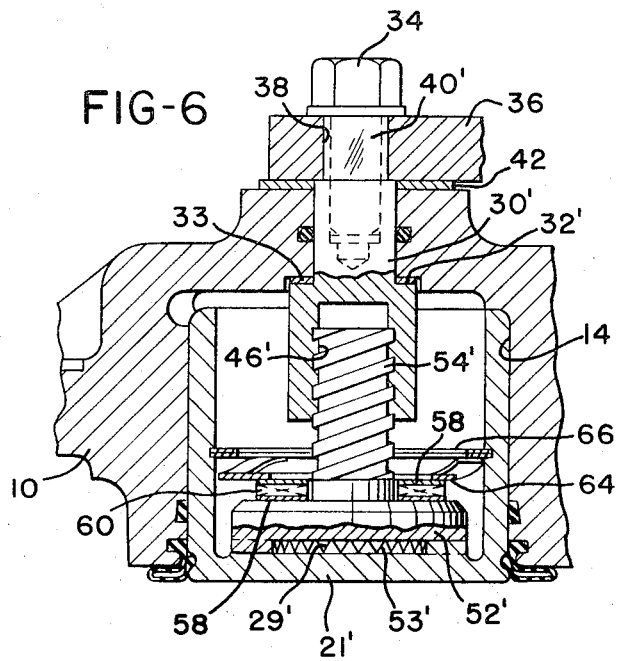
FIGS. 6 is a view similar to FIG. 3 showing a second preferred embodiment of the invention.

As seen in FIGS. 1 through 3 of the drawings, a first embodiment of the invention includes a caliper housing 10 having a pair of cylinders 12 and 14 interconnected by a cross passage 16, which in turn communicates with a flow port 18. A piston 20 is received in the cylinder 12 while a piston 21 is slidably received in the cylinder 14. Suitable seals, as at 22, and boots, at 23, are provided as is usual in disk brake assemblies.

With this construction it will be apparent that pressurized fluid, such as hydraulic fluid, admitted through the port 18 will force the pistons 20 and 21 outwardly out of their respective cylinders. The pistons engage a backing plate 24 which presses a brake pad 25 against a disk 26 of a wheel with which the brake system is associated.

The piston 21 is of hollow construction and has pressed fitted therein a member 28 having an annular toothed surface 29. Alternatively, the toothed surface may be simply machined or otherwise formed on an inner surface of the piston, as will be seen in connection with the second preferred embodiment of the invention described below.

A shaft 30 is rotatably mounted in the housing and fixed against longitudinal movement with respect to the axis thereof by means of the shoulder portion 32, a thrust washer 33 and a bolt 34 extending through a lever 36 and threaded into the outer end of the shaft 30.

The opening 38 through the lever 36 is of other than circular configuration and that portion 40 of the shaft 30 is of complementary configuration, so that rotating the lever 36 results in rotation of the shaft 30. Additionally, a washer 42 may be interposed between the lever 36 and the housing 10 at the boss 44 formed thereon.

That portion of the shaft 30 which extends into the piston 21 is threaded with a high lead screw 46. The member 28 fixed in the piston 21 has an opening through the center thereof larger in diameter than the major diameter of the threaded portion of the shaft 30 so that the shaft 30 may move freely into the member 28.

An internally threaded pressure member 52 is also received in the piston 21 and has an annular toothed surface 53 complementary to and engageable with the toothed surface 29 of the member 28. Member 52 is formed as an internally threaded nut member having its threads 54 complementary to and in engagement with the thread 46 of the shaft 30. A pair of spaced washers 58 form a race for a needle thrust bearing 60, the race and bearing resting on an annular shoulder 62 of the nut member 52.

The threads 46 and 54 have a helix angle, the tangent of which is greater than their coefficient of friction. As a result, the threads 46 and 54 have a dual capability. That is, they may function as overhauling threads or as power threads.

A finger spring 64 engages the upper washer 58 and a retaining ring 66 received in a groove 68 in the piston 21 holds the finger spring in place, urging the nut member 52 and the toothed surface 53 thereof into engagement with the toothed surface 29 of the fixed member 28.

With this construction, it will be seen that each time the brake system is actuated hydraulically the pistons 20 and 21 will move a slight distance outwardly of their respective cylinders to cause brake pad 25 to exert greater pressure on the disk 26 of the vehicle wheel.

Since the shaft 30 is fixed against longitudinal movement with respect to the housing 10 and since the nut member 52 is threaded on the shaft 30, each time the piston moves outwardly the toothed surfaces of members 28 and 52 will separate a slight amount, as seen at 70 in FIG. 5 of the drawings.

Eventually, after the brake pads have worn to some extent, the separation of the toothed surfaces upon actuation of the brake will be greater than the depth 72 of the teeth on the surfaces 29 and 56. This will allow the nut member 52 to rotate with respect to the shaft 30 and the member 28 and the finger spring 64 will cause this rotation. That is, the finger spring 64 will urge the member 52 outwardly toward the member 28. Since the member 52 is, as noted above, internally threaded and in threaded engagement with the high-lead screw thread 46 of the shaft 30, and since the shaft 30 is fixed against movement, outward movement of the member 52 by the pressure exerted by the finger spring 64 causes the member 52 to rotate about the shaft 30. As the nut member 52 rotates about the shaft 30, it will move outwardly along the shaft and into engagement with member 28 as seen in FIG. 4, thereby compensating for wearing of the brake pad.

When it is desired to set the parking brake, this may be accomplished either entirely mechanically or hydraulically with mechanical holding in the hydraulically actuated position. In either case, the lever 36 rotates the shaft 30 about its axis, causing the nut member 52 to move outwardly along the shaft 30. This movement of member 52 along shaft 30 will either push piston 21 outwardly after which it is mechanically held in this position, or holds the piston 21 in its outward position following hydraulic actuation.

Turning now to FIG. 6 of the drawings, a second preferred embodiment of the invention will be described. The embodiment of FIG. 6 is in many ways similar to the embodiments of FIGS. 1 and 3, including the general mode of operation, and in the description below like parts are referenced with the same reference numerals while similar parts are referenced with a prime numeral.

Thus, a caliper 10 is formed with a cylinder 14 therein receiving a piston 21'. A shaft 30' is rotatably mounted in the housing and is fixed aginast longitudinal movement by means of a shoulder portion 32', a thrust washer 33 and a bolt 34 extending through a lever 36 and threaded into the outer end of the shaft 30'. As in the embodiments of FIGS. 1 through 3, the opening 38 through the lever 36 and the portion 40' of the shaft 30' are of complementary configuration, so that rotating the lever 36 results in rotation of the shaft 30'.

Whereas the shaft 30 is externally threaded, the shaft 30' is internally threaded, as indicated at 46'. Similarly, whereas the pressure member 52 is internally threaded to receive the shaft 30, the pressure member 52' is externally threaded, at 54', and is received within the internally threaded portion 46' of the shaft 30'.

As in the previous embodiment, pressure member 52' is urged towards the opposing face of the piston 21' by means of a finger spring 64 held in place by a retaining ring 66 and bearing against the pressure member 52 through the thrust bearing 60 disposed between a pair of washers 58.

While the piston 21' could be provided with a press fitted insert as in the embodiments of FIGS. 1 through 3, it may also have the inner toothed surface 29' thereof formed directly on its inner surface as shown in FIG. 6 of the drawings. Thus, toothed surface 29' is machined or otherwise formed on the inner surface of the piston 21' and is complementary to the annular toothed surface 53' formed on the opposing face of the pressure member 52'.

The operation of the embodiment of FIG. 6 is nearly identical to the operation of the previous embodiment. That is, the piston 21' will move a slight distance outwardly of the cylinder 14 each time the brakes are actuated to cause a brake pad associated with the system to exert a greater pressure on the disk of the vehicle wheel. During this actuation the teeth 53' of the pressure member 52' will separate a slight amount from the toothed surface 29'.

After the brake pads have experienced some wear, the opposing toothed surfaces 29' and 53' will separate an amount greater than the depth of the teeth thereof. This will allow the pressure member 52' to rotate with respect to the shaft 30' under the urging of the finger spring 64. As the member 52' rotates about the shaft 30' it will move along the shaft until its toothed surface 53' engages the toothed surface 29', thereby compensating for brake pad wear.

The parking brake for the system shown in FIG. 6 is also operated in the same manner as the parking brake of the previous embodiment. The piston 21' can initially be moved outwardly into the braking position either hydraulically or mechanically and the lever 36 thereafter rotated, causing the shaft 30' to rotate about its axis and cause the pressure member 52' to move outwardly along the shaft 30'. This movement of the pressure member 52' along the shaft 30' will either push the piston 21' outwardly after which it is held mechanically in this position, or hold the piston 21' in its outward braking position after it has been actuated hydraulically.

From the above it will be seen that the present invention provides a system for either mechanically actuating disk brakes and holding them in position or hydraulically actuating the brakes and mechanically holding them in position, and means for compensating automatically for wear of the brake pads.

While the forms of apparatus herein described constitute preferred embodiments of the invention, it is to be understood that the invention is not limited to these precise forms of apparatus, and that changes may be made therein without departing from the scope of the invention.

What is claimed is:
1. A disk brake assembly comprising:
 a. a caliper housing,
 b. means defining a cylinder in said housing,
 c. a piston slidably received in said cylinder,
 d. means for admitting pressurized fluid to said cylinder to cause said piston to move outwardly thereof,
 e. means defining an annular toothed surface on said piston facing inwardly of said cylinder,
 f. a shaft rotatably mounted in said housing and extending into said cylinder axially thereof,
 g. means for fixing said shaft against movement longitudinally thereof with respect to said housing while accommodating rotational movement about the axis thereof,
 h. means defining a high lead thread on at least that portion of said shaft positioned within said cylinder,
 i. a pressure member having a thread complementary to and in engagement with said thread on said shaft,
 j. means defining an annular toothed surface on said pressure member complementary to and engageable with said annular toothed surface on said piston,
 k. means urging said pressure member and said toothed surface thereon into engagement with said toothed surface on said piston, and
 l. means for rotating said shaft about the axis thereof.

2. The assembly of claim 1 wherein said means urging said pressure member comprises:
 a. spring means encircling said shaft.
3. The assembly of claim 1 wherein said rotating means comprises:
 a. lever means fixed to said shaft.
4. The assembly of claim 1 wherein:
 a. said threads have a helix angle, the tangent of which is greater than their coefficient of friction, whereby said threads are capable of acting as both overhauling and power threads.
5. The asembly of claim 1 wherein:
 a. the depth of the teeth on said toothed surfaces is substantially less than the thickness of brake pad means associated with said assembly whereby wearing of said brake pad means is compensated by separation of said toothed surfaces and reengagement thereof.
6. The assembly of claim 1 further comprising:
 a. means defining a second cylinder in said housing, and
 b. a second piston received in said second cylinder,
 c. said admitting means admitting pressurized fluid to both of said cylinders.
7. The assembly of claim 1 wherein:
 a. said pressure member is externally threaded, and
 b. said high lead screw on said shaft is formed as an internal thread thereof.
8. The assembly of claim 1 wherein:
 a. said high lead thread on said shaft comprises an external thread, and
 b. said pressure member comprises a nut member having said threads thereon formed internally thereof.
9. A disk brake assembly comprising:
 a. a caliper housing,
 b. means defining a pair of substantially parallel cylinders in said housing,
 c. first and second pistons slidably received in said cylinders,
 d. means for admitting pressurized fluid into said cylinders to force said pistons outwardly thereof,
 e. means defining a boss on said housing in axial alignment with said cylinder receiving said second piston,
 f. a shaft member extending through said boss into said cylinder,
 g. means fixing said shaft against movement longitudinally thereof and allowing rotation thereof about its axis,
 h. said second piston being of substantially hollow construction and having therein means defining an annular toothed surface facing inwardly of said cylinder receiving said second piston toward said boss,
 i. means defining a high lead thread on a portion of said shaft received within said cylinder,
 j. a pressure member having a thread thereon complementary to and in engagement with said high lead thread on said shaft,
 k. means defining an annular toothed surface on said pressure member complementary to and engageable with said annular toothed surface in said second piston,
 l. means defining an annular shoulder on said pressure member extending in spaced, substantially parallel relationship to said annular toothed surface thereon,
 m. bearing means engaging said annular shoulder,
 n. spring means fixed in said second piston in engagement with said bearing means urging said pressure member and said annular toothed surface thereon into engagement with said annular toothed surface in said second piston, and
 o. lever means fixed to a portion of said shaft projecting outwardly of said boss on said housing.
10. The assembly of claim 9 wherein:
 a. said high lead thread on said shaft is formed as an external thread, and
 b. said pressure member comprises a nut member having said threads thereon formed internally thereof.
11. The assembly of claim 9 wherein:
 a. said high lead thread on said shaft is formed as an internal thread, and
 b. said complementary thread on said pressure member is formed as an external thread.

* * * * *